US008584961B2

(12) United States Patent
Teggatz et al.

(10) Patent No.: US 8,584,961 B2
(45) Date of Patent: Nov. 19, 2013

(54) MARKING VERIFICATION SYSTEM

(75) Inventors: Ross Teggatz, McKinney, TX (US); Wayne Chen, Plano, TX (US)

(73) Assignee: Triune IP LLC, Richardson, TX (US)

(*) Notice: Subject to any disclaimer, the term of this patent is extended or adjusted under 35 U.S.C. 154(b) by 284 days.

(21) Appl. No.: 13/051,529

(22) Filed: Mar. 18, 2011

(65) Prior Publication Data
US 2012/0069119 A1   Mar. 22, 2012

Related U.S. Application Data

(60) Provisional application No. 61/315,381, filed on Mar. 18, 2010.

(51) Int. Cl.
*G06K 19/06* (2006.01)
(52) U.S. Cl.
USPC .......................................... 235/494; 235/451

(58) Field of Classification Search
USPC ......................................... 235/494, 492, 451
See application file for complete search history.

(56) References Cited

U.S. PATENT DOCUMENTS

| | | | |
|---|---|---|---|
| 6,831,562 B2* | 12/2004 | Rodgers et al. | 340/572.4 |
| 7,940,593 B2* | 5/2011 | Buer et al. | 365/225.7 |
| 2008/0272886 A1* | 11/2008 | Tiller et al. | 340/10.1 |
| 2009/0060703 A1* | 3/2009 | Beffa | 414/806 |
| 2009/0134909 A1* | 5/2009 | Madurawe | 326/38 |
| 2011/0008527 A1* | 1/2011 | Teggatz et al. | 427/2.23 |

* cited by examiner

Primary Examiner — Ahshik Kim
(74) Attorney, Agent, or Firm — Hovey Williams LLP

(57) ABSTRACT

A marking system and related methods are disclosed in which a micromark having optically readable characteristics and electronically readable characteristics is made on a selected object. The optically and electronically readable characteristics of the micromark contain corresponding data. Preferred embodiments of the invention include non-volatile memory for storing duplicate data.

28 Claims, 3 Drawing Sheets

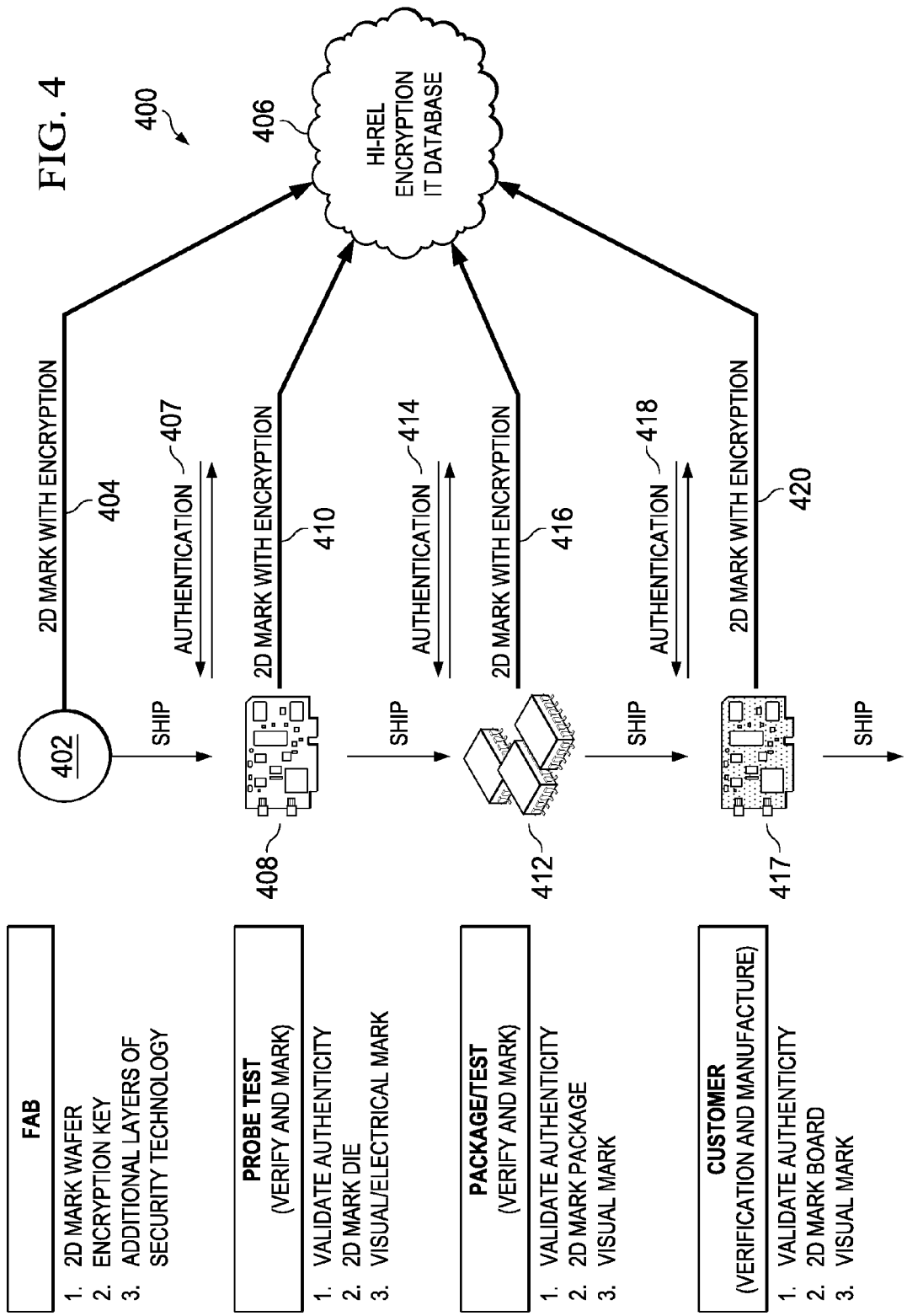

MARKING VERIFICATION SYSTEM

PRIORITY ENTITLEMENT

This application is entitled to priority based on Provisional Patent Application Ser. No. 61/315,381 filed on Mar. 18, 2010, which is incorporated herein for all purposes by this reference. This application and the Provisional Patent Application have at least one common inventor.

TECHNICAL FIELD

The invention relates to the marking of objects with data such as identification or serialization data. More particularly, the invention relates to micromarkings, and micromarking and reading systems and methods for providing and using optically and electronically readable encoded data on manufactured goods and other articles.

BACKGROUND OF THE INVENTION

Detecting and deterring counterfeit products is a significant challenge in many endeavors, for example, semiconductor devices, pharmaceuticals, consumer goods, currency, or items of particular value. Commercial product marking standards exist in industries such as automotive, defense, medical, and electronics in applications where traceability of particular items or parts is desirable. These standards are part of endeavors to ensure that traceable identifying marks are suitable for process control in the relevant applications. Marking is also sometimes desirable for tracking and/or authenticating unique or valuable objects such as diamonds, bullion, or weapons systems. Among the problems associated with marking, there is often a trade-off between a desire to keep the marking small, and to provide large amounts of information. Additional problems may be encountered in connection with the reading of markings. In different operating environments and with different marked objects, optically readable marks and/or electronically readable marks may be more useful, feasible, convenient or cost-effective.

Thus, the present state of the art presents problems in terms not only of marking size, but also other physical characteristics. Due to these and other problems and potential problems with the current state of the art, improved micromarking and reading systems and methods would be useful and advantageous contributions to the arts.

SUMMARY OF THE INVENTION

In carrying out the principles of the present invention, in accordance with preferred embodiments, the invention provides advances in the arts with marking systems and methods providing optically and electrically readable micromarks for recording data on objects.

According to one aspect of the invention, a marking system includes a micromark having attributes which are both optically readable and electronically readable.

According to additional aspects of the invention, the marking system also includes nonvolatile memory.

According to another aspect of the invention, a preferred embodiment of a micromark includes a matrix for storing data. The matrix possesses optically readable features and electronically readable non-volatile memory.

According to one aspect of the invention, the marking system includes one or more micromarks residing on a semiconductor device.

According to an additional aspect of the invention, a preferred embodiment of a method for marking includes steps for inscribing a micromark on an object. The micromark has optically readable characteristics and electronically readable characteristics for accessing the data.

According to aspects of the invention, the marking method also includes steps for inscribing micromarks on a semiconductor device or wafer.

According to another aspect of the invention, in preferred embodiments the marking method also includes steps for encrypting the data content of the micromark.

According to one aspect of the invention, the marking method also includes the step of inscribing a micromark on an object to form an open circuit in an electrical element.

The invention has advantages including but not limited to providing systems and methods through which relatively large amounts of data may be recorded and stored in a relatively small area on objects. Another advantage of preferred embodiments of the marking systems and methods is that micromarks placed on an object may be read either optically or electronically. These and other advantageous features and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which:

FIG. 4 is a diagram showing the implementation of methods of marking according to preferred embodiments of marking systems according to the invention.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as anticipated and unanticipated advantages of the invention.

DESCRIPTION OF PREFERRED EMBODIMENTS

This application is related to U.S. patent application Ser. No. 12/646,529 which is incorporated herein or all purposes by this reference. This application and the related application have at least one common inventor. Identification and verification systems and methods increase the content of and readability of information that may be provided in a mark on a physical object. A micromark in the form of a very small two-dimensional matrix is placed on the object and may be read using one or more electrical or optical techniques. The very small size of the two-dimensional matrix facilitates the storage of a significant amount of information on the object, which can be read to verify product authenticity, inform users of product specifications, provide instructions or security data, and the like. The stored data may include, for example, information such as serial number, date of production, date of validation, manufacturer, operator, facility/site information, etc, and may also be supplemented through an encrypted database.

Figure 1:
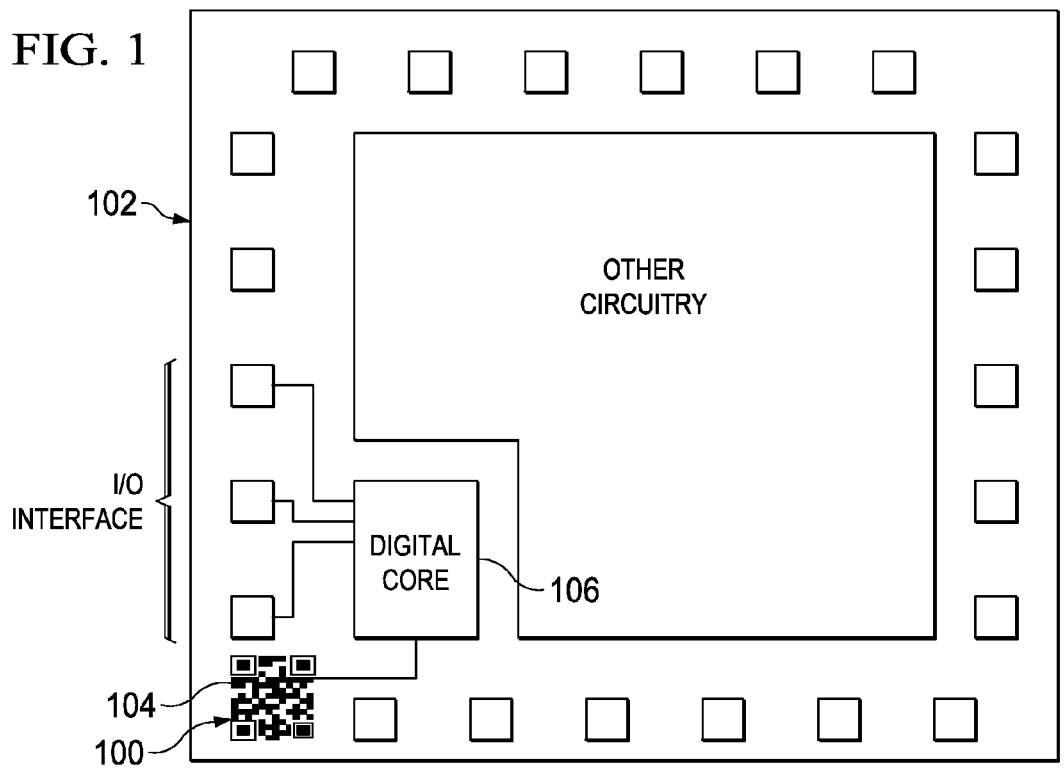
FIG. 1 is a simplified top view of a preferred embodiment of a marking system according to the invention.

Examples of preferred embodiments of the concepts of the invention are illustrated in the Figures. Referring initially to FIG. 1, a micromark 100 in the form of a two-dimensional data matrix is shown. In this example, the micromark 100 is inscribed on a semiconductor die 102 during the manufacturing or testing processes. In implementations for which further verification of the heritage of a die is desired, the micromark may be inscribed on the semiconductor wafer relatively early in the manufacturing process. In this way, the micromarking system and methods may be used to track individual semiconductor devices from wafer, to die, to incorporation into end-use systems. The micromark 100 may be inscribed by machining with a laser, by electrical means such as "blowing" fuses, blowing zener zap structures, blowing gate oxide structures, chemically etching as with photo resist patterning, chemically etching the device surface to vary the physical height of the cell, printing, or other means to inscribe a substantially two-dimensional micromark on the wafer or die. Preferably, the micromarks are made in the form of a matrix of individual cells 104 in which data may be encoded. The physical micromarks, regardless of how made, may preferably be optically observed. Additionally, the micromarks may preferably also be read electronically. In some instances, micromarks may be optically observed at one or more stage in a process flow, and may be obscured from view in others. For example, a micromark made on a wafer may remain susceptible to optical observation during wafer processing, die singulation, and packaging, but may become shielded from view when incorporated into electronic apparatus. It is preferable that such micromarkings remain accessible however, thus electronically readable micromarks are useful. Supplementing optical readability with an implementation susceptible to electronic reading may be used to provide an unbroken chain of identification and verification of the micromark throughout a product's entire manufacturing and distribution path. In the exemplary implementation shown in FIG. 1, the micromark 100 matrix cells 104 may optionally be read optically or electronically. Preferably, each cell of 104 a micromark 100 is electrically connected to a digital circuit 106 adapted for reading the micromark.

Figure 2:
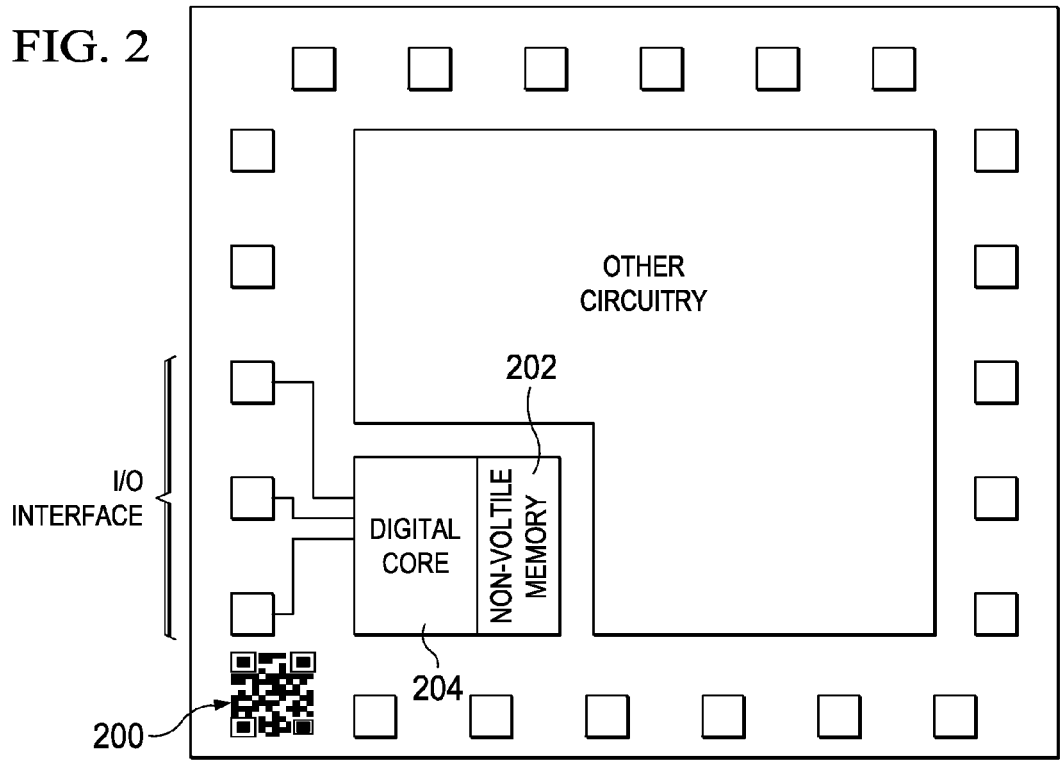
FIG. 2 is a simplified top view of another preferred embodiment of a marking system according to the invention.

FIG. 2 shows a simple diagram of another example of a micromark 200 in which the data stored in the micromark 200 is stored in duplicate in a separate non-volatile memory 202. In this example, the optically readable micromark 200 may or may not be electronically readable as well. Preferably, the data stored in the micromark is encoded in a suitable format, which may include encryption, and stored in digital form in the separate non-volatile memory 202. In a verification step, the data can be verified to match the data optically visible and/or electronically readable from the micromark 200. The data stored in the separate non-volatile memory 202 may be hidden from normal access by uninformed users, requiring a specific sequence of events and/or to permit access to the electronic micromark data. Suitable circuitry 204 is provided for accessing the memory 202 for writing and reading data.

Figure 3:
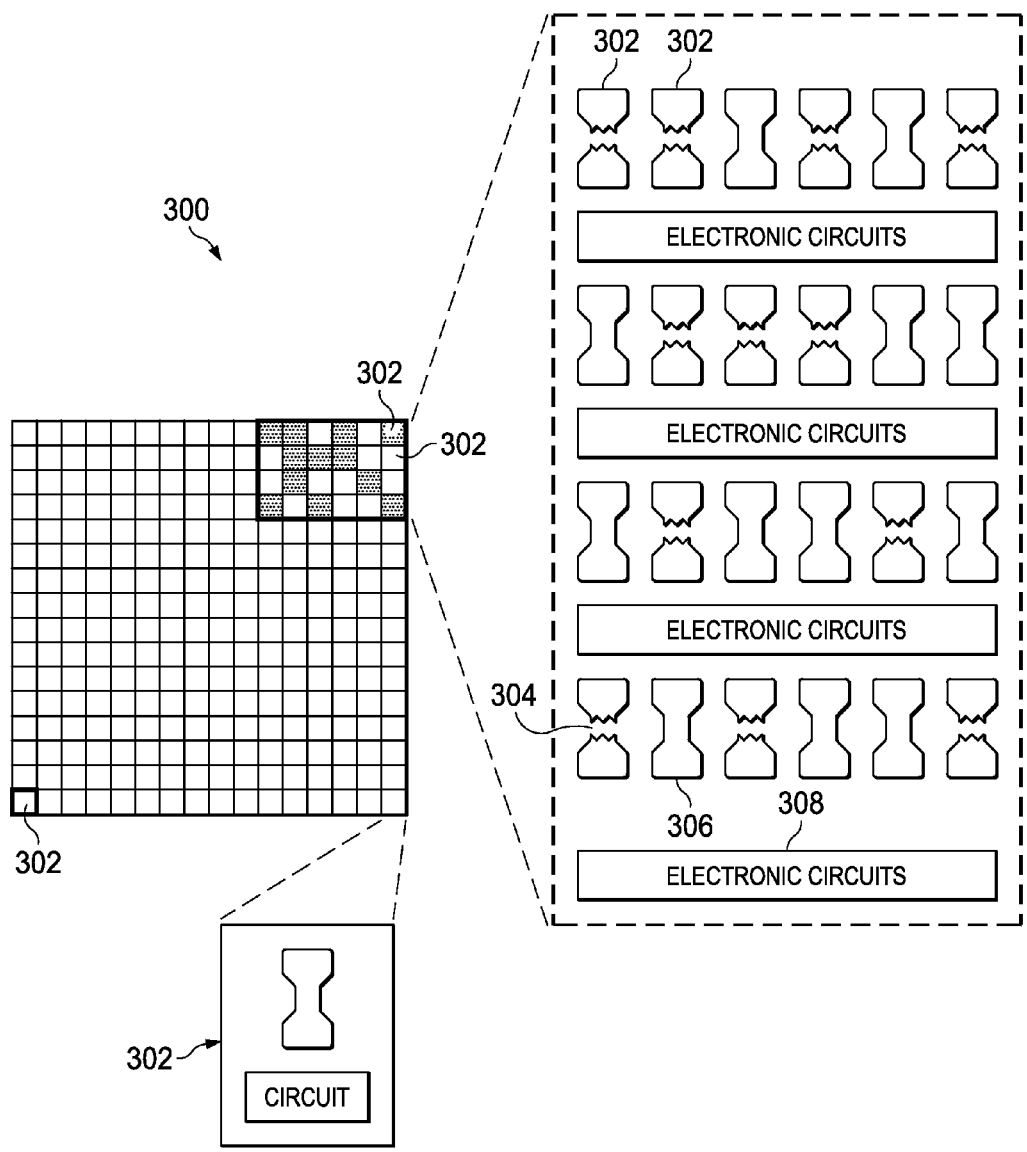
FIG. 3 is a top view of an example of a preferred embodiment of a micromark according to the invention.

Examining an example of a micromark 300 in further detail referring primarily to FIG. 3, the micromark 300 is preferably implemented in the form of a matrix of cells 302. The cells 302 preferably have two possible states. In the exemplary embodiment depicted in FIG. 3, the cells 302 are implemented in the form of electrical fuse structures. The cells may exist in an open-circuit "blown" state, e.g., 304, and a closed-circuit "un-blown" state, e.g., 306. Each potential state may be defined to represent a particular cell value, e.g., a zero, one, or some other assigned value. Thus, a matrix of such cells may be used to represent a wide range of data in an encoded form. The cells 302 are associated with circuitry 308 for reading the programmed values embodied therein. In addition to having distinct electrical states, the state of each cell 302 is also preferably detectable by its visual appearance observable by eye or by suitable optical apparatus. The cells 302 may be implemented through an electronic means, e.g., by blowing fuses electrically, or by cutting, melting, or machining them using a laser or other tools. Cells may be made from conductive materials such as metal, or from poly-silicon or other materials. In substitution for the simple fuses shown, the cells may also be implemented using other components such as, for example but not limited to, gate oxide rupture structures, and zener zaps. The additional electronic circuitry 308 used for reading cells 302 may be placed adjacent to, around, or under each cell 302 to read its state. This information is then provided to a digital core or interface to allow the data to be read from the micromark 300 electronically. This system provides an advantage in making the micromark data available for reading through both optical inspection and electronic circuitry. In this way, the micromark may be read by selecting the more convenient reading technique according to particular conditions, such as location of a micromarked component in a larger system. The micromark data may be encrypted by using suitable encryption techniques for its encoding, either as optically readable two-dimensional data or as electronically readable data.

An example showing the methods and systems of the invention operation illustrated in FIG. 4. An example of a system 400 is shown in an implementation for the tracking and authentication of high-reliability semiconductor devices. This is one example of a preferred embodiment of the invention and is provided for the purposes of describing the principles and application of the invention. Those skilled in the arts should appreciate that the invention may be implemented in other contexts. Illustrating an exemplary verification/authentication process, during the wafer fabrication process, a two-dimensional micromark is placed on the wafer, step 402. The data contained in this micromark is sent 404 to an information technology database 406, the contents of which are preferably securely encrypted in this example. Depending on the application, it may be desirable to track the wafer, or to track individual devices, in which case, each device may be individually marked. In the case of individually marked devices, each device may be identically marked, for example identifying a production lot, or each device may be uniquely marked for maximum traceability. Preferably, the micromarkings are situated so that they can be read both optically and electronically during the manufacturing process. In operation, for example, micromarks used for tracing products during production may be placed on off-die locations on the wafer, such as on scribe streets between individual devices. During probe testing as commonly practiced in the arts, the wafer is determined to be either an acceptable wafer or a rejected wafer. The database 404 is then updated, and the rejected wafers are preferably removed from the production chain. The unacceptable wafers can either be destroyed, or further marked with micromarks indicating their status as having failed to meet particular testing standards.

After the wafer has been authenticated 407, a two-dimensional micromark is made at a suitable location on each die 408. This two-dimensional micromark may be implemented using several alternative technologies. For example, the micromarks may be inscribed with a laser by removing metal, poly, or other materials present on the die. The micromarks may also be made by blowing selected fuses in a fuse array provided for that purpose. The micromarks may be made at any time during production, preferably after the wafer has been probe tested, and after the particular die has been verified to be an acceptable die. Unacceptable die are preferably micromarked accordingly, either by altering previously-made micromarks or by marking with indicia identifying them as deficient. In either case, the database 406 is updated, step 410, to record the status of the individual die. As above, the micromarked die can preferably be read either visually or electronically.

During the die packaging process 412, die are checked to validate 414 authenticity by matching the die to the information represented in the database 406. Die bearing micromarks indicating defects or unverified status are removed from the supply chain. The rejected die removed from the production process during the packaging stage may have the two-dimensional micromark on each individual die altered or destroyed to prevent reuse. The rejected die may optionally be marked with an additional micromark on each individual die, for example with a tracking code, to provide for tracing subsequent movement of the die. Once testing of good die has been accomplished, then a two-dimensional micromark is placed on the package, and the information is transferred to the database 416. During final assembly 417, the packaged die is checked to validate authenticity 418. Rejected and non-validated packages are preferably are removed from the distribution chain. The database 406 is updated accordingly 420.

Semiconductor manufacturing is used as an example herein for the purposes of description of the principles and practice of the invention. The process flow shown and described herein may be suitably altered for implementation in other industries as well in order to provide the benefits of micromarking objects for tracking and authentication purposes. For example, similar applications include pharmaceutical, currency, consumer goods, unique or precious objects, military supplies and hardware, and the like. In one potential variation of embodiments of the invention, rejected objects may be marked with data indicating their limitations and/or unacceptability for particular uses. In another variation, marked objects may be traced to assist in identifying stolen or counterfeit goods. It is contemplated that the level of encryption may be duplicated, increased, or decreased at various stages in a micromarking and tracking process. For example, if a die initially includes 128 bits of data/encryption, once the die is placed in a package, an additional 128 bits of data/encryption may be added to the package, thus the total data in such a case is 256 bits if two unique marks are used.

While the making and using of various exemplary embodiments of the invention are discussed herein, it should be appreciated that the present invention provides inventive concepts which can be embodied in a wide variety of specific implementations. It should be understood that the invention may be used in various contexts without departure from the principles disclosed herein. For example, the systems and methods described may be adapted for use with components and parts of larger mechanical or electrical systems, for use in authenticating and tracking unique items such as gemstones, works of art, antiques, historical artifacts, or other items for which tracking may be desirable such as weapons, pharmaceuticals, and hazardous materials. For purposes of clarity, detailed descriptions of functions, components, and systems familiar to those skilled in the applicable arts are not included. The methods and apparatus of the invention provide one or more advantages including but not limited to, reduced marking size, increased data content, and/or dual or alternative readability. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A marking system comprising:
   a micromark having optically readable characteristics and electronically readable characteristics, wherein the optically and electronically readable characteristics contain corresponding data and reside on the same object, the micromark including a plurality of two-state cells arranged in a two-dimensional array with a plurality of rows and a plurality of columns, each cell including a fuse and a circuit configured to set the state and read the state, the cells positioned such that, within a row, all of the fuses are aligned and all of the circuits are aligned.

2. The marking system according to claim 1, wherein the wherein the micromark further comprises nonvolatile memory cells.

3. The marking system according to claim 1, wherein the micromark further comprises fuses.

4. The marking system according to claim 1 wherein the micromark further comprises metallic fuses.

5. The marking system according to claim 1, wherein the micromark further comprises poly-silicon fuses.

6. The marking system according to claim 1, wherein the micromark further comprises zener zaps.

7. The marking system according to claim 1, wherein the micromark further comprises gate oxide rupture structures.

8. The marking system according to claim 1, wherein the micromark further comprises encrypted data.

9. The marking system according to claim 1, wherein the micromark resides on a semiconductor wafer.

10. The marking system according to claim 1, wherein the micromark resides on a semiconductor device.

11. The marking system according to claim 1, wherein the micromark resides on currency.

12. The marking system according to claim 1, wherein the micromark resides on a pharmaceutical product.

13. The marking system according to claim 1, wherein the micromark resides on a consumer product.

14. The marking system according to claim 1, wherein the micromark resides on a unique object.

15. A marking method comprising the steps of:
    inscribing a micromark on an object, the micromark having optically readable characteristics and electronically readable characteristics, wherein the optically and electronically readable characteristics contain corresponding information, the micromark including a plurality of two-state cells arranged in a two-dimensional array with a plurality of rows and a plurality of columns, each cell including a fuse and a circuit configured to set the state and read the state, the cells positioned such that, within a row, all of the fuses are aligned and all of the circuits are aligned.

16. The marking method according to claim 15, further comprising the step of verifying the data content of the micromark.

17. The marking method according to claim 15, further comprising the step of encrypting the data content of the micromark.

18. The marking method according to claim 15, wherein the step of inscribing a micromark on an object further comprises forming an open circuit in an electrical element.

19. The marking method according to claim 15, wherein the step of inscribing a micromark on an object further comprises forming a closed circuit in an electrical element.

20. The marking method according to claim 15, wherein the step of inscribing a micromark on an object further comprises laser machining a surface.

21. The marking method according to claim 15, wherein the step of inscribing a micromark on an object further comprises chemically etching a surface.

22. The marking method according to claim 15, wherein the step of inscribing a micromark on an object further comprises altering a surface material by applying electric current.

23. The marking method according to claim 15, further comprising the step of storing duplicate micromark data in a database.

24. A micromark comprising:
a matrix comprising optically readable features and electronically readable non-volatile memory; whereby data stored in the matrix may be read optically and electronically, the matrix including a plurality of two-state cells arranged in a two-dimensional array with a plurality of rows and a plurality of columns, each cell including a fuse and a circuit configured to set the state and read the state, the cells positioned such that, within a row, all of the fuses are aligned and all of the circuits are aligned.

25. A micromark according to claim 24 wherein the optically readable features and electronically readable non-volatile memory store identical data.

26. A micromark according to claim 24 wherein one optically readable feature and one electronically readable non-volatile memory cell are implemented in one unitary physical element.

27. A semiconductor die with integrated circuitry and a plurality of perimeter-positioned wire bond pads, the semiconductor die comprising:
a micromark having optically readable characteristics and electronically readable characteristics, wherein the optically and electronically readable characteristics contain corresponding data and are collocated, the micromark being positioned at a perimeter of the die in alignment with the wire bond pads; and
a micromark access circuit separated on the die from the micromark and the integrated circuitry, the micromark access circuit configured to electronically read the micromark.

28. The semiconductor die of claim 27, wherein the micromark includes a plurality of two-state cells arranged in a two-dimensional array with a plurality of rows and a plurality of columns, each cell including a fuse and a circuit configured to set the state and read the state, the cells positioned such that, within a row, all of the fuses are aligned and all of the circuits are aligned.

* * * * *